United States Patent [19]

Tsuboi et al.

[11] Patent Number: 5,499,113
[45] Date of Patent: Mar. 12, 1996

[54] IMAGE DATA PROCESSING SYSTEM WITH STILL VIDEO CAMERA AND DIGITAL IMAGE FORMING APPARATUS

[75] Inventors: Toshio Tsuboi, Mahwah, N.J.;
Munehiro Nakatani, Toyohashi, Japan;
Hirokazu Yamada, Kobe, Japan;
Kunihiko Omura, Toyokawa, Japan

[73] Assignee: Minolta Camera Kabushiki Kaisha, Osaka, Japan

[21] Appl. No.: 368,751

[22] Filed: Jan. 4, 1995

Related U.S. Application Data

[63] Continuation of Ser. No. 846,832, Mar. 6, 1992, abandoned.

[30] Foreign Application Priority Data

| Mar. 19, 1991 | [JP] | Japan | 3-081956 |
| Mar. 22, 1991 | [JP] | Japan | 3-083305 |
| Jun. 19, 1991 | [JP] | Japan | 3-081957 |

[51] Int. Cl.⁶ .................................................. H04N 5/76
[52] U.S. Cl. .................... 358/479; 358/335; 358/350; 358/448; 358/444
[58] Field of Search ........................ 358/479, 256, 358/335, 906, 468, 280, 444, 293, 443, 209, 93, 909, 210, 474, 229, 403, 452, 342, 224, 162, 213.15, 530, 450, 209, 244; 360/15, 48, 63, 98; 340/723, 731, 728, 745, 712, 286.13; 345/132, 173; 101/93, 109

[56] References Cited

U.S. PATENT DOCUMENTS

| 4,013,876 | 3/1977 | Anstin | 358/299 X |
| 4,057,830 | 11/1977 | Adcock | 358/127 |
| 4,262,301 | 4/1981 | Erlichman | 358/6 |
| 4,494,156 | 1/1985 | Kadison et al. | 360/48 |
| 4,751,583 | 6/1988 | Levine | 358/256 |
| 4,837,628 | 6/1989 | Sasaki | 358/209 |
| 4,888,648 | 12/1989 | Takeuchi et al. | 358/335 |
| 4,891,634 | 1/1990 | Ina et al. | 340/723 |
| 4,937,762 | 6/1990 | Todome | 340/706 X |
| 4,994,921 | 2/1991 | Zajac | 358/244 |
| 5,021,876 | 6/1991 | Kurita et al. | 358/75 |
| 5,063,599 | 11/1991 | Concannon et al. | 382/7 |
| 5,133,024 | 7/1992 | Froessl | 382/41 |
| 5,229,814 | 7/1993 | Hube et al. | 355/203 |
| 5,255,107 | 10/1993 | Copenhaver et al. | 358/474 |

FOREIGN PATENT DOCUMENTS

| 63-286078 | 11/1988 | Japan . |
| 64-30026 | 1/1989 | Japan . |
| 64-54991 | 3/1989 | Japan . |
| 1-281441 | 11/1989 | Japan . |

OTHER PUBLICATIONS

Article in "Photographic Industry" magazine, published Nov. 1988.
"Color Station PIXEL DiO" catalog manufactured by Canon Co., Ltd.

*Primary Examiner*—Paul Ip
*Attorney, Agent, or Firm*—Willian Brinks Hofer Gilson & Lione

[57] ABSTRACT

An image data processing system includes a still video camera having a detachable storing medium for storing an image data, and a digital image forming apparatus in which an image of an original document is read by an image sensor to generate an image data, and the image is formed on a paper with electrophotographic process based on the image data. Also, the image data is processed in the image forming apparatus to be stored on the storing medium of the still video camera loaded detachably from the image forming apparatus.

25 Claims, 15 Drawing Sheets

Fig. 13 (a) 1st processing mode
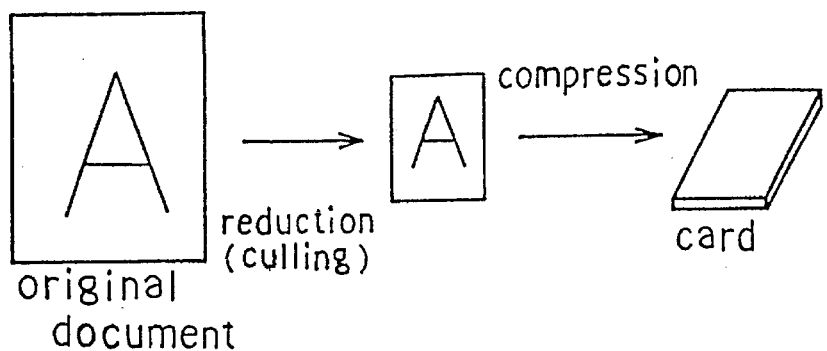
Fig. 13 (b) 2nd processing mode
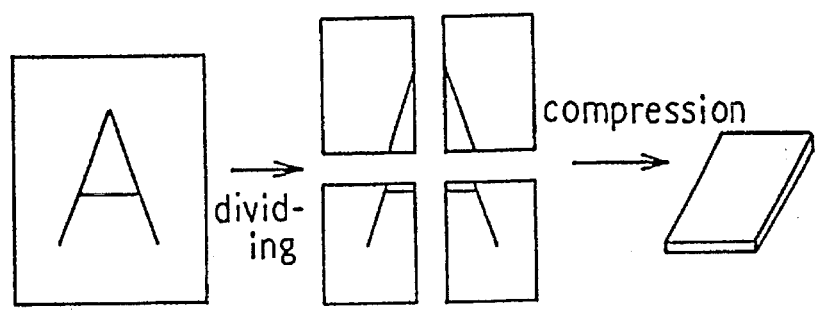
Fig. 13 (c) 3rd processing mode
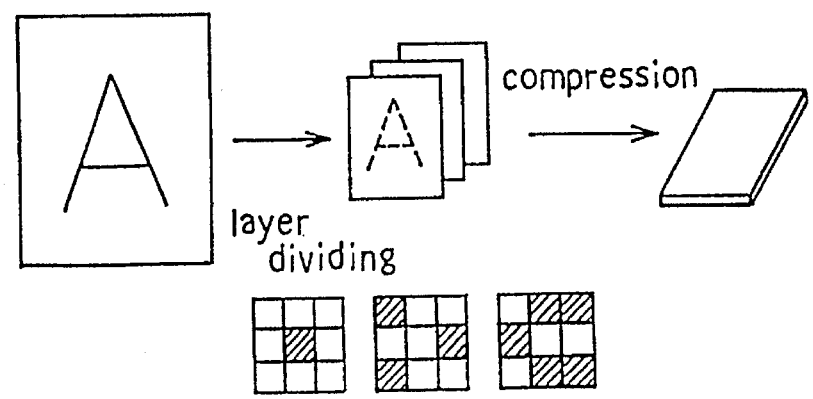

IMAGE DATA PROCESSING SYSTEM WITH STILL VIDEO CAMERA AND DIGITAL IMAGE FORMING APPARATUS

This application is a continuation application Ser. No. 07/846,832, filed Mar. 6, 1992 abandoned.

BACKGROUND OF THE INVENTION

The present invention relates to an image data processing system with a still video camera and a digital image forming apparatus. More specifically, the present invention relates to an image data processing system for recording an image data obtained by reading an image in an original document on a recording medium of a still video camera, and for forming an image on a paper from the image data.

It is conventionally known a digital copier in which an image in an original document is converted into an image data by a photoelectric transfer element, and a recording head is driven in response to the image data, thereby a reproduced image corresponding to the image of the original document is formed on a paper. Meanwhile, a still video camera has been developed in recent years in which a photographed image is converted into an image data photoelectrically, the image data being recorded on recording media such as a magnetic disk, an IC card, a CD-ROM and the like.

It is in common between the above-mentioned conventional digital copier and the electronic still video camera at the point that an image is converted into an image data. However, there is no idea that the image data is used in common between both devices. Accordingly, the image data obtained from the digital copier cannot be written on a recording medium of the still video camera, that is, the image data is not adapted to common data. While, the resolution of the digital copier is generally higher than that of the electronic still video camera. Accordingly, the number of the image data for one scene of the digital copier is greater than that of the electronic still video camera. Therefore, there is no interchangeability between the data of both devices. It may be an idea that the image data is culled to write the image data of the digital copier on the recording medium of the still video camera. However, in this case, it occurs a problem of the resolution being degraded.

In a conventional image forming apparatus, it is known that an image data is read out from a video floppy disk and printed out by a printer, as disclosed in Japanese Laid-Open Patent Publication No. 64-54991. Further, it is known a still video camera which provides a monitor and a printer, as disclosed in U.S. Pat. No. 4,262,301.

The image data obtained from the still video camera is recorded on recording media such as a video floppy disk, an IC card and the like. It is convenient if there is an index such as a negative film to see the content of the image data. In the above-mentioned prior arts, a digital color copier is used as a printer. When the image data in the video floppy disk is printed out in a hard copy print, a memory is fully used to adapt the speed for processing the data between the digital copier and the still video camera. Therefore, it causes a problem that a memory having large capacity is required, and, especially in case of color image recording, the cost of the memory becomes very high. In use as an index, when frame recording is executed in which one frame is recorded with two fields on a video floppy disk, even only one field is printed out in a hard copy print, the degradation of the image becomes little problematic and the capacity of the memory may become smaller.

SUMMARY OF THE INVENTION

An object of the present invention is to provide an image processing system with a still video camera and a digital image forming apparatus, in which an image data obtained from image reading out means such as a digital copier can be written on a recording medium being detachable from the apparatus, for example, a recording medium of a still video camera. Accordingly, the data of the both apparatus can be used in common. An image signal is converted into an electric signal with a predetermined form by an image signal processing means and written on a recording medium by a recording medium driving means so that the degradation of the resolution can be prevented even when the data is used in common.

It is another object of the present invention is to provide an image processing system with a still video camera and a digital image forming apparatus, in which, when an image is recorded by the frame recording, among the image signals read out from the recording medium, only the image signal for one field is stored in storing means. When the image recorded on a floppy disk is utilized as an index, even an image for one field is stored, little degradation of the image is occurred. Accordingly, the capacity for a memory in the storing means is halved so that the cost for the memory can be greatly reduced.

BRIEF DESCRIPTION OF THE DRAWINGS

FIGS. 13(a), (b), (c) illustrate three processing modes of the culling/dividing processing section;

DETAILED DESCRIPTION OF THE PREFERRED EMBODIMENTS

Preferred embodiments of the present invention will be particularly described hereinafter with reference to the accompanying drawings.

Figure 1:
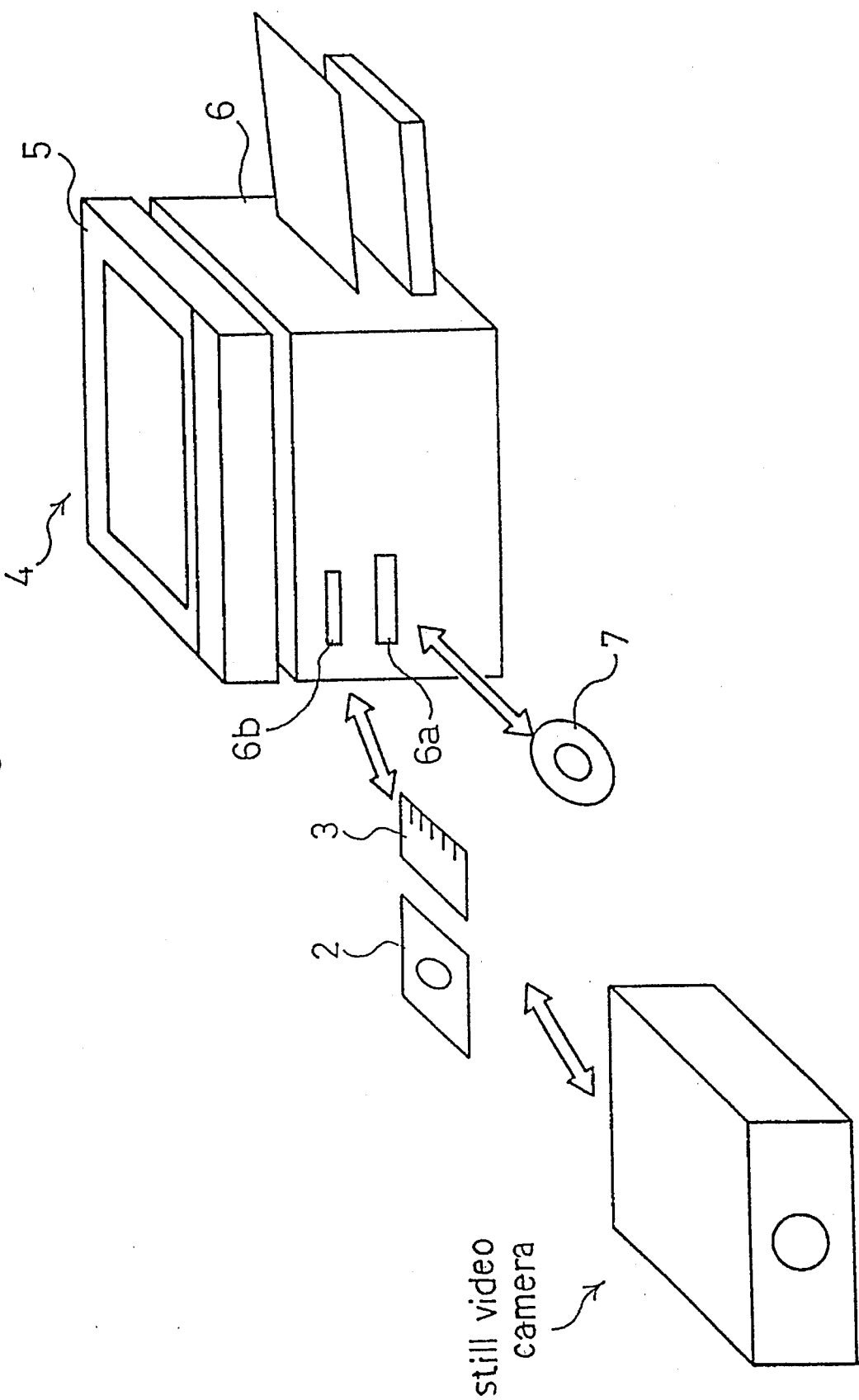
FIG. 1 is an outside view showing an embodiment of an image data processing system according to the present invention.

FIG. 1 illustrates an image data processing system combining a still video camera 1 and a digital color copier 4 according to one embodiment of the present invention. The still video camera 1 records a still image on recording media such as a video floppy disk 2, an IC card 3 and the like. The digital color copier 4 comprises an image reader section 5 and a printer section 6. The digital color copier 4 converts an image in an original document into an electric signal with an imaging device and forms an image corresponding to the electric signal on a copy paper by using an electrophotography system. The digital color copier 4 provides a recording medium driving section for reading or writing data in various kinds of recording media, or a filing device, and insert slits 6a, 6b to which the recording media being detachable from the driving section. A CD-ROM 7 is inserted in the insert slit 6a, and the video floppy disk 2 or the IC card 3 is inserted in the insert slit 6b. Because the CD-ROM 7 has large memory capacity, it is designed that an image data is written from the floppy disk 2 and the IC card 3 to the CD-ROM 7 by the filing device. Instead of the CD-ROM 7, a digital audio tape recorder (DAT) can be used.

Figure 2:
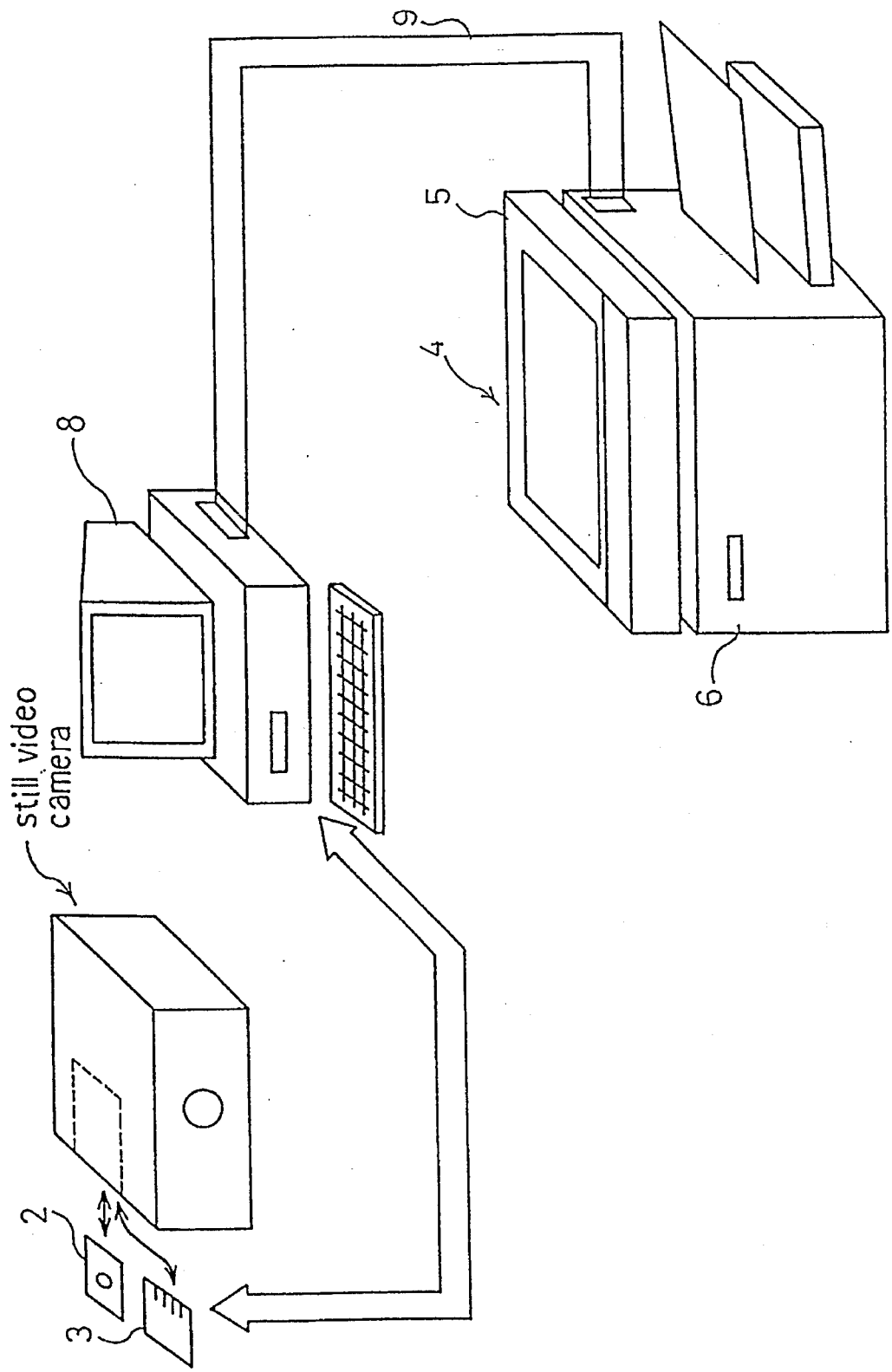
FIG. 2 is an outside view showing another embodiment of the image data processing system.

FIG. 2 illustrates an image data processing system combining the still video camera 1, a personal computer 8 and the digital color copier 4 according to another embodiment of the present invention. In this embodiment, an image photographed by the still video camera 1 can be variously processed by the personal computer 8. An interface 9 (hereinafter referred to as I/F) between the personal computer 8 and the digital color copier 4 may be a personal computer interface or recording media such as the IC card 3 and the like.

Figure 3:
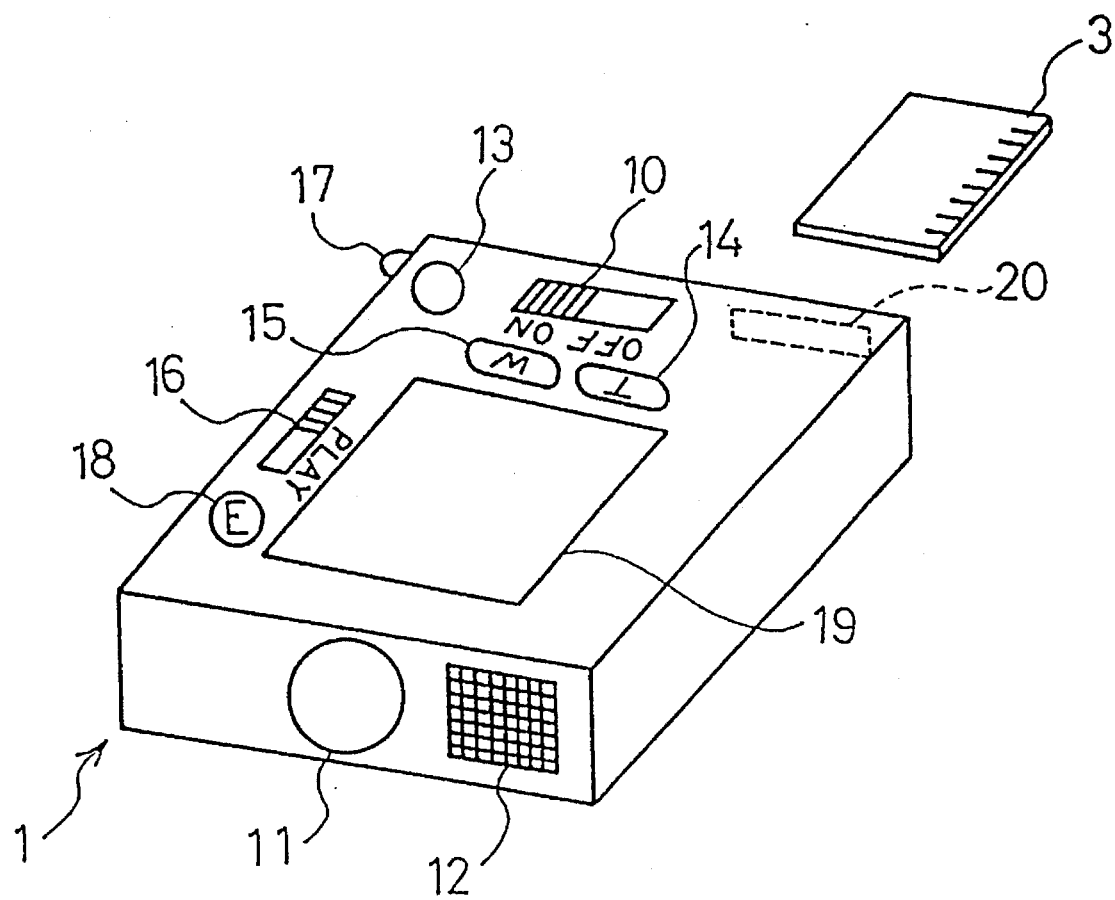
FIG. 3 is an outside view showing a structure of a still video camera.

FIG. 3 is an outside view showing the still video camera 1. A power supply switch 10 for activating the camera makes the still video camera 1 to an active condition when the switch is set to ON, and an inactive condition when being set to OFF. The still video camera 1 provides a photographing zoom lens 11, a flash 12, and a release switch 13. The still video camera 1 also provides a switch 14 for long focal length, and a switch 15 for short focal length. These switches have functions to move the photographing zoom lens 11 in photographing, and forward or reverse the recorded image in reproducing. Further, the still video camera 1 provides a TV output switch 16 for reproducing the recorded image, a TV signal output terminal 17 for connecting the still video camera 1 and a TV, a delete switch 18 for deleting the recorded image and a liquid crystal display 19 comprising liquid crystal being provided on the upper side of the still video camera 1. The liquid crystal display 19 indicates the number of frame and being in a photographing mode, when photographing is carried out, and indicates being in a reproducing mode when reproducing is carried out. The IC card 3 for recording a photographed image is inserted in an insert slit 20. Referring to FIG. 3, the IC card 3 is used for a recording medium. However, not being limited to the IC card, the floppy disk 2, the CD-ROM 7, the DAT and the like may be used.

Figure 4:
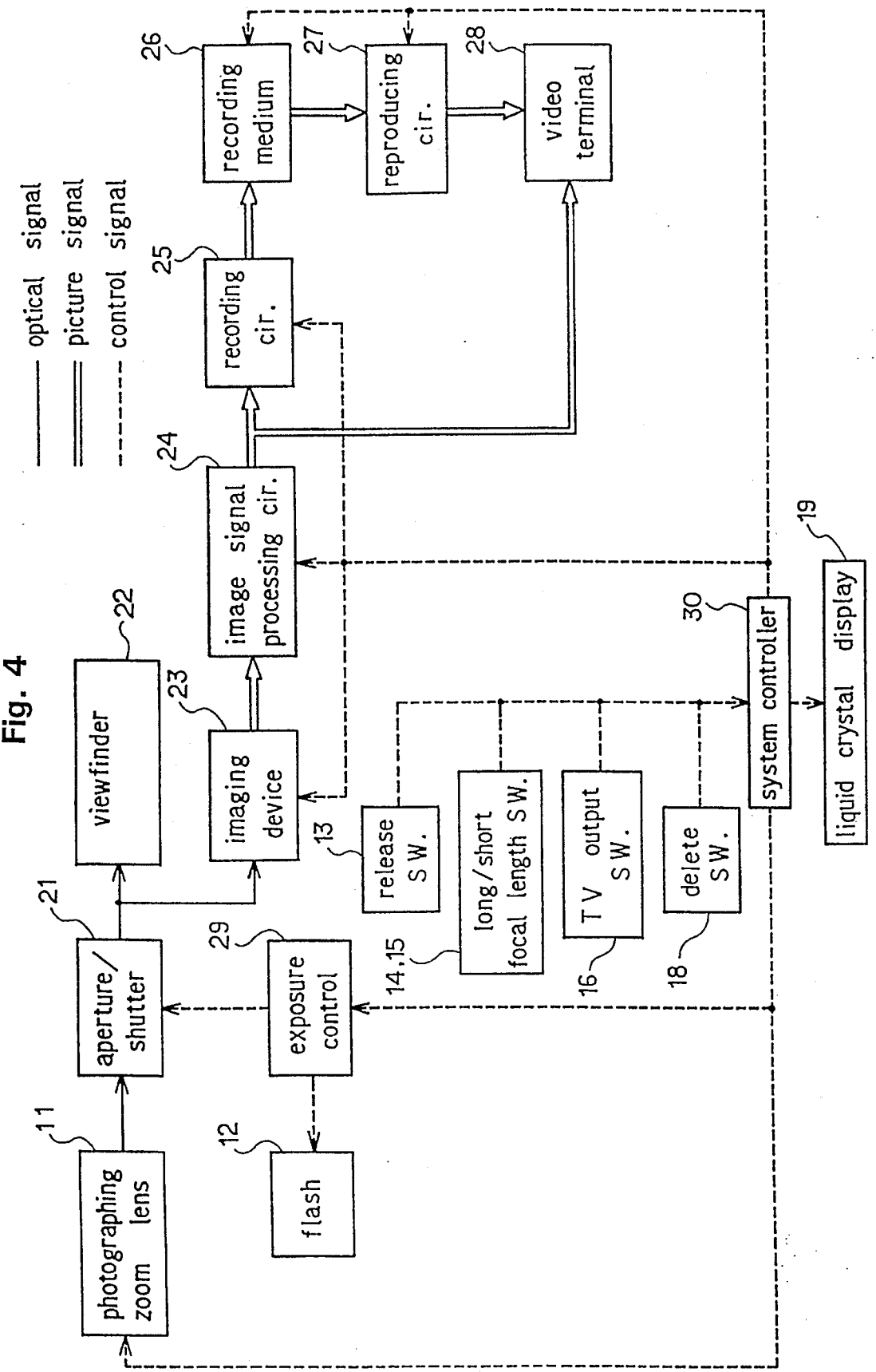
FIG. 4 is a functional block diagram of the still video camera.

FIG. 4 is a functional block diagram of the still video camera 1. Referring to FIG. 4, an optical system such as the photographing zoom lens 11, a diaphragm or shutter section 21, a viewfinder 22 and the like, and an exposure control section 29, a flash 12, are basically identical to those of a camera using a silver halide film. The photographing zoom lens 11 varies magnification with the switch 14 for long focal length and the switch 15 for short focal length. An imaging device 23 as an image reading out means converts an optical signal which is incidented through the photographing zoom lens 11 and the aperture or shutter section 21 into an electric signal (picture signal). As an imaging device, a solid state device such as a MOS (metal oxide semiconductor) can be used besides a CCD (charge coupled device). An image signal processing circuit 24 forms a color video signal comprising a luminance signal and a chrominance signal from a picture signal outputted from the CCD 23 as the imaging device.

A recording circuit 25 converts the color video signal into a signal suitable for the recording media 26 such as the IC card 3, the floppy disk 2, the CD-ROM 7, the DAT and like, and records the signal thereon. A reproducing circuit 27 reads out the color video signal from the recording media 26, and reproduces. A video terminal 28 outputs the color video signal transmitted from the image signal processing circuit 24 or the reproducing circuit 27 on a TV monitor for reproducing. A system controller 30 controls the whole system of the device. The system controller 30 receives instructions from the release switch 13, the switch 14 for long focal length, the switch 15 for short focal length, the TV output switch 16 and the delete switch 18, and displays the instructions on the liquid crystal display section 19. In FIG. 4, continuous line indicates the flow of an optical signal, double line indicates that of a picture signal and dotted line indicates that of a control signal.

Figure 5:
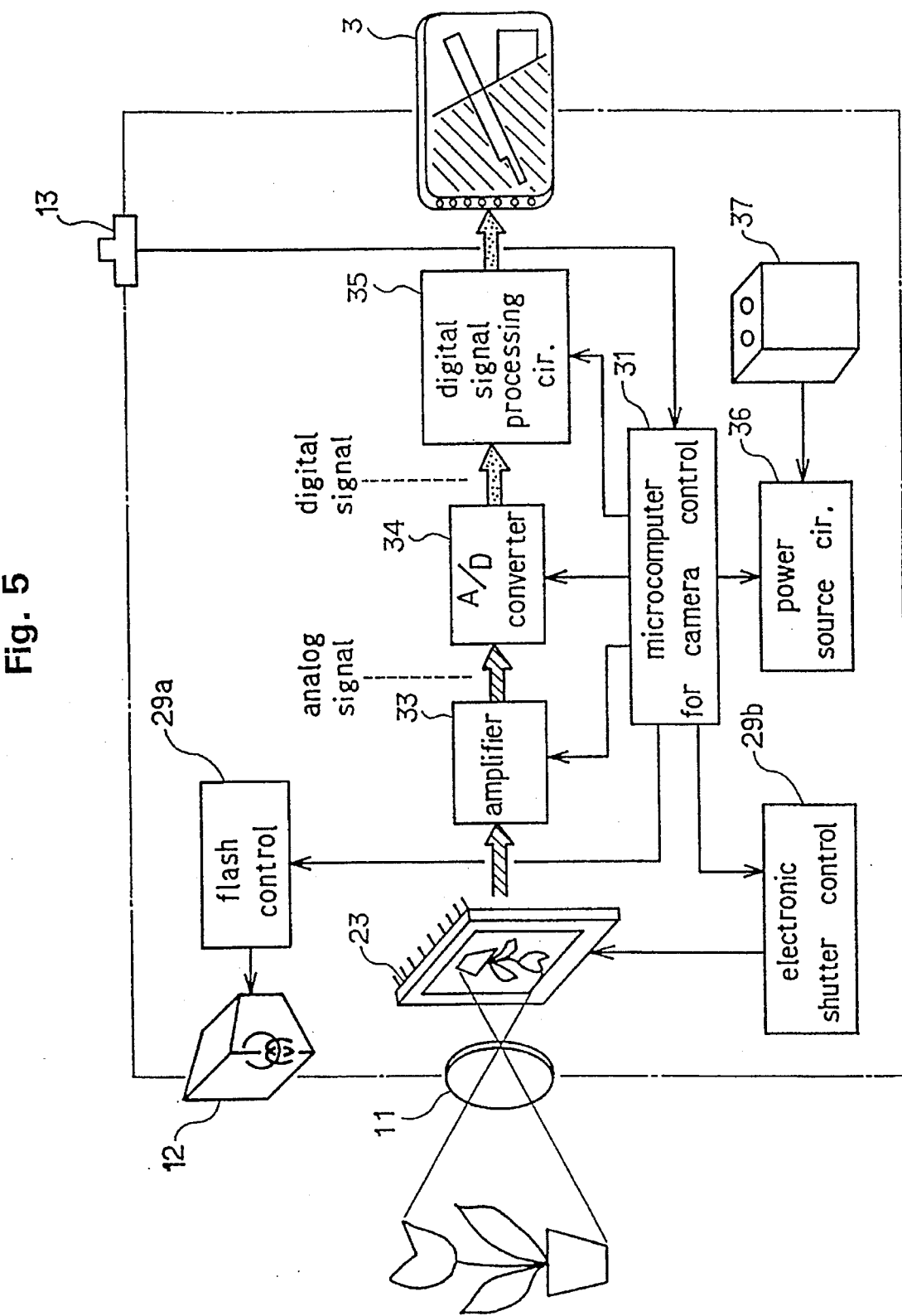
FIG. 5 is a functional block diagram in which an image signal photographed by the still video camera is converted into a digital signal, and recorded on an IC card.

FIG. 5 is a block diagram showing a structure in which an image signal photographed by the still video camera 1 is converted into a digital signal, and recorded on the IC card 3. The reference number in FIG. 5 is identical to corresponding reference number described above. A microcomputer 31 for controlling a camera corresponds to the system controller 30. Similarly, an amplifier 33, an A/D (analog-to-digital) converter 34 and a digital signal processing circuit 35 corresponds to the image signal processing circuit 24 or the recording circuit 25. The microcomputer 31 for controlling a camera controls a flash control section 29a, an electronic shutter control section 29b, the amplifier 33, the A/D converter 34, the digital signal processing circuit 35, a power source circuit 36 and the like. A power source is supplied by a battery 37.

Figure 6:
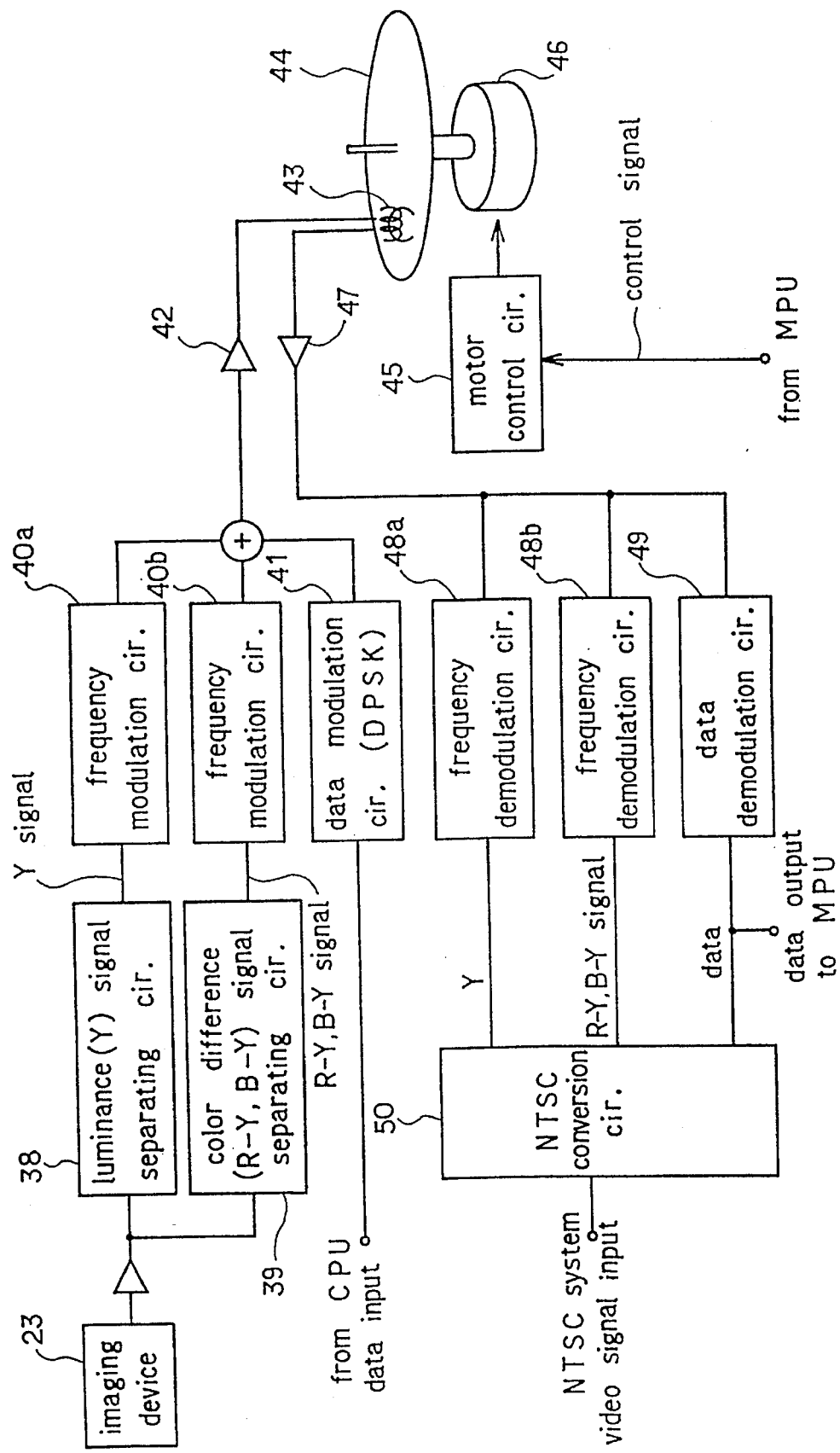
FIG. 6 is a functional block diagram in which a photographed image signal is converted into an analog signal and recorded on a magnetic disk.

Now, a processing operation in which the image signal is recorded on the IC card 3 is described. The flash 12 is emitted by receiving an instruction form the release switch 13. The object image is formed on the imaging device 23 through the photographing zoom lens 11 and converted into an electric signal. The electric signal is amplified by the amplifier 33, converted to a digital signal by the A/D converter 34, outputted to the digital signal processing circuit 35, in which the signal is processed for recording and recorded on the IC card FIG. 6 is a block diagram showing a structure in which a photographed image signal is converted into an analog signal and recorded on a magnetic disk 44. An electric signal outputted from the imaging device 23 is amplified by an amplifier, separated to a Y signal, a R-Y signal and a B-Y signal by a luminance signal (Y) separating circuit 38 and a color difference (R-Y, B-Y) signal separating circuit 39, each signal being frequency modulated by frequency modulation circuits 40a and 40b respectively. An additional data such as date and the like outputted from a CPU (not shown) is modulated by a data modulation circuit 41 (DPSK), fed to a recording head 43 through a recording amplifier 42 with the frequency modulated image signal, and recorded on the magnetic disk 44.

The motor driving circuit 45 is activated by a control signal outputted from a MPU (micro processor unit) (not shown), then the rotational speed of the magnetic disk 44 is controlled through a motor 46 and driven with a predetermined rotational speed. A reproducing amplifier 47 amplifies an output from the reproducing head. The reproduced signal is transmitted to frequency demodulation circuits 48a, 48b and a data demodulation circuit 49. The Y signal and the R-Y, B-Y signals are converted into analog signals. After being demodulated, the reproduced signal is outputted to the MPU. The reproduced signals are converted into video signals in the form of NTSC (National Television System Committee) system by a NTSC conversion circuit 50 and outputted.

Figure 7:
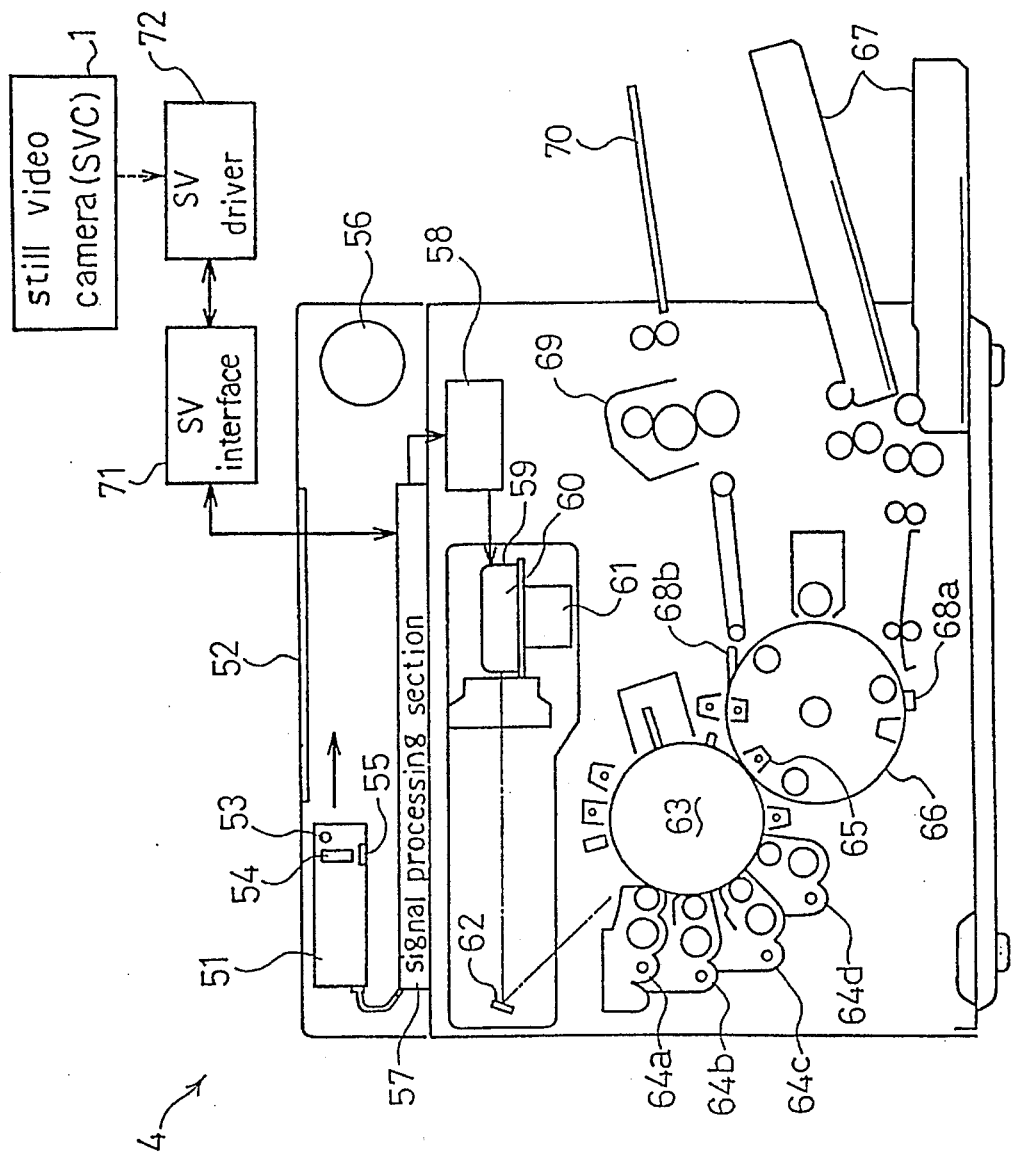
FIG. 7 illustrates whole structure of a digital color copier according to the present invention.

FIG. 7 shows a whole structure of the digital color copier 4. In case of forming image comprising a plurality of colors, the digital color copier 4 repeatedly executes reading out an image in an original document of each color and forming an image on a copy paper. A scanner 51 comprises an exposure lamp 53 for illuminating the original document set on an original document setting board 52, a rod lens array 54 for condensing reflected light from the original document, a CCD color sensor 55 for converting an image in the original document into an electric signal by receiving the condensed light. The scanner 51 which is driven by a motor 56 scans along the original document setting board 52.

The electric signal obtained from the CCD color sensor 55 is converted into any chrominance signal of yellow, magenta, cyan or black in a signal processing section 57. When the copying operation is executed, the chrominance signal is transmitted to a printer head section 59 through a buffer memory 58. The printer head section 59 provides a semiconductor laser 60 and a semiconductor laser driving circuit 61 for driving the semiconductor laser 60 corresponding to the chrominance signal transmitted from the signal processing section 57. The laser beam generated from the semiconductor laser 60 is modulated in accordance with the chrominance signal of the image in the original document. The laser beam exposes a photosensitive drum 63 through a mirror 62. Thereby, an electrostatic latent image which corresponds to color component of the image in the original document is formed on the photosensitive drum 63.

The electrostatic latent image formed on the photosensitive drum 63 is developed by a developing unit corresponding to the image, in which each developing unit 64a to 64d contains toner of yellow, magenta, cyan or black, and converted into a toner image. The toner image is transferred on a copy paper spooled on a transfer drum 66 by a transfer charger 65. When a full-color image is formed, the above-mentioned procedure corresponding to each color, yellow, magenta, cyan or black is executed repeatedly. When a monochrome image is formed, one of the above-mentioned procedure corresponding to one color is executed.

A copy paper is provided from a paper cassette 67, and spooled to the transfer drum 66 being kept the edge of the paper by a chucking system 68a. After the whole toner images are transferred, the copy paper is separated from the transfer drum 66 by a claw for separation 68b, and fed to a printout tray 70 through a fixing device 69.

The signal processing section 57 is connected to a still video camera driver 72 (hereinafter referred to as a SV driver) through a still video camera interface 71 (hereinafter referred to as a SV interface). The signal processing section 57 converts an electric signal obtained from the CCD color sensor 55 into a chrominance signal, and outputs the signal to the SV interface 71. The SV interface 71 has functions to convert the chrominance signal into the electric signal having a form capable of being stored on a storing medium of the still video camera 1, and output the signal to the SV driver 72. The SV driver 72 has a function to store the transferred signal on the storing medium of the still video camera 1. Contrary to that, it may be possible that the image signal is read out from the storing medium of the still video camera 1 by the SV driver 72, the signal being processed for conversion of the picture element density by the SV interface 71, and stored on the buffer memory 58 in the digital color copier 4 through the signal processing section 57.

Figure 8:
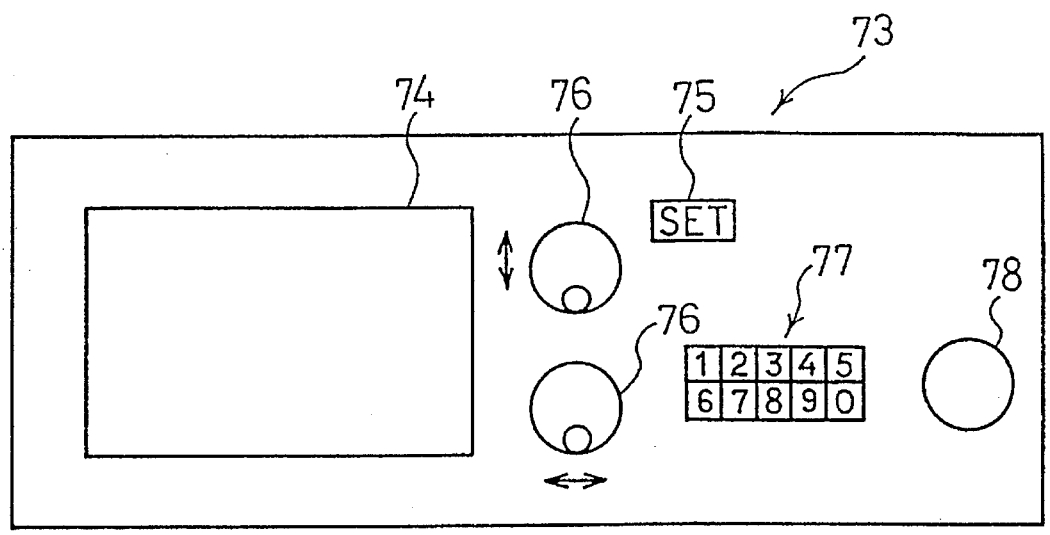
FIG. 8 is a schematic view showing a structure of a control panel of the digital color copier.
Figure 9:
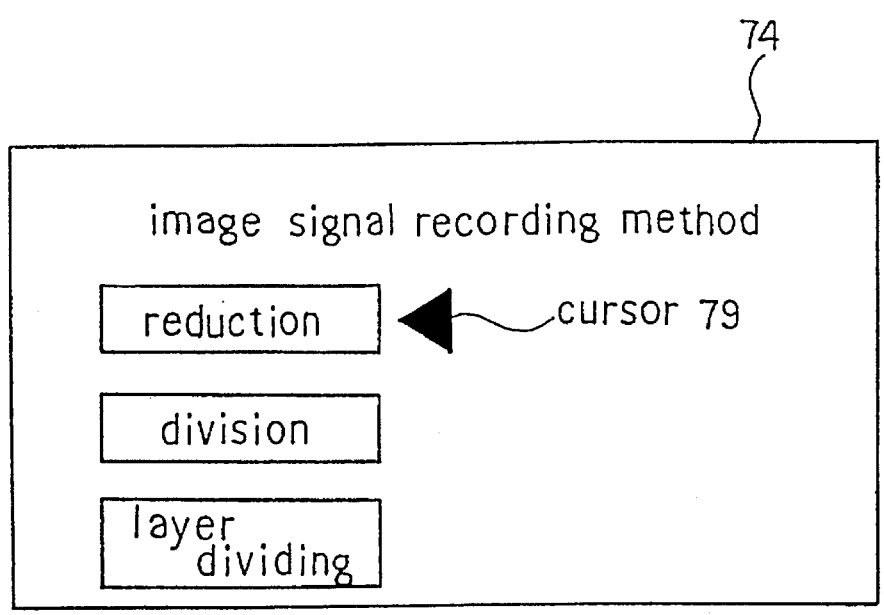
FIG. 9 illustrates an example of a display in a liquid crystal display section of the digital color copier.

FIG. 8 is a schematic view showing a structure of a control panel of the digital color copier 4 according to the present invention. The control panel 73 comprises a liquid crystal display section 74, a set key 75, a jog dial 76, a numeral key 77, a print key 78 and the like. An optional menu can be displayed on the liquid crystal display section 74 by operating the jog dial 76 and the set key 75. For example, when an image signal read out from the original document by the color copier 4 is stored on the storing medium of the still video camera 1, an operating menu as shown in FIG. 9 is displayed to select a desired method for recording image signal. A cursor 79 is moved by operating the jog dial 76, and after being designated the desired method for recording image signal, the desired method is selected by pushing the set key 75. In addition to this, a condition is set by displaying or selecting various kinds of operational menu.

Figure 10:
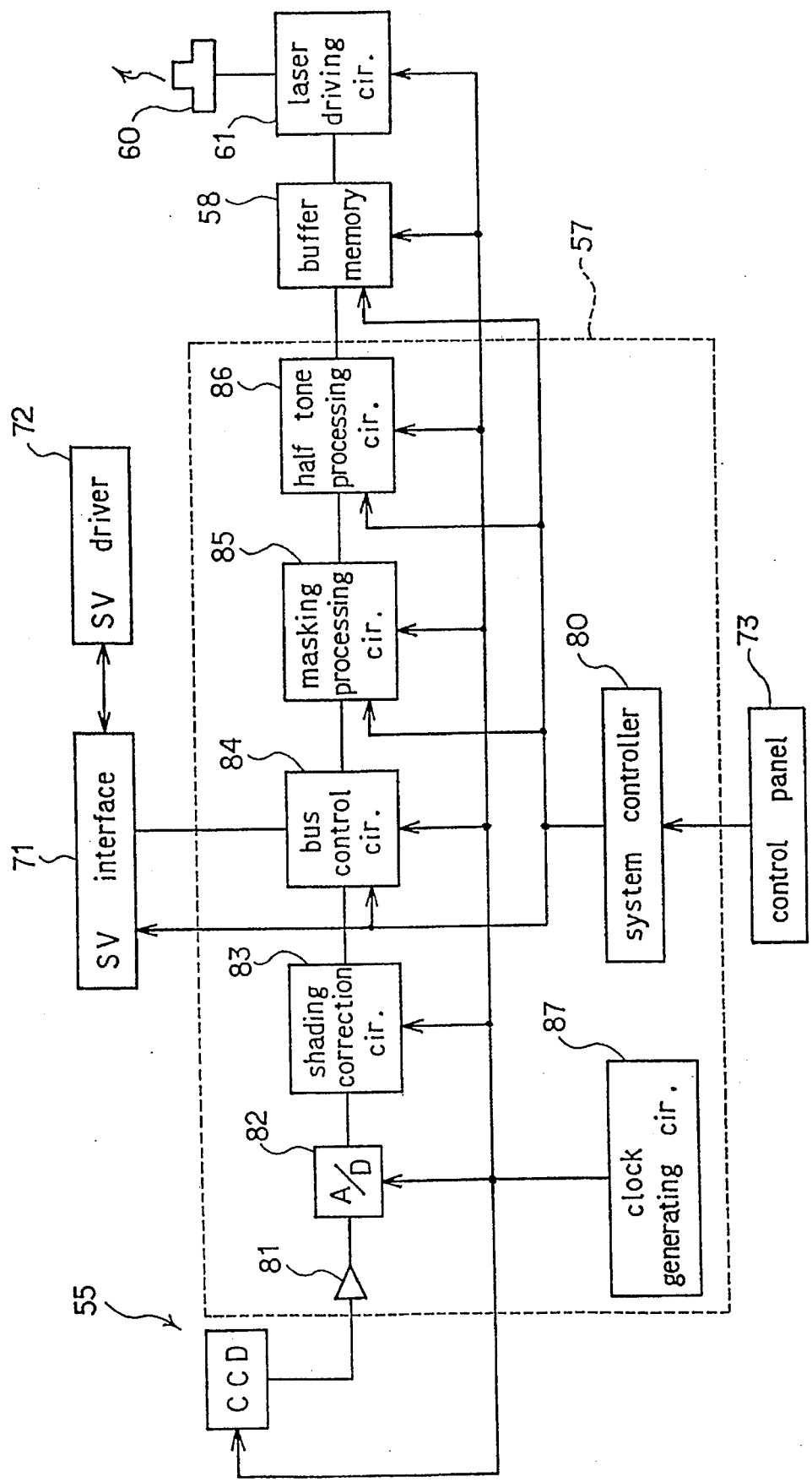
FIG. 10 is a block diagram showing a process of an electric signal obtained from a CCD color sensor of the digital color copier.

FIG. 10 is a block diagram showing a process of an electric signal obtained from the CCD color sensor 55. A system controller 80 controls the signal processing section 57, the buffer memory 58 and the SV interface 71 based on the signals transmitted from the control panel 73 and the other. A clock generating circuit 87 forms and outputs a clock signal for synchronizing each circuit. The electric signal obtained from the CCD color sensor 55 is converted into a digital signal by an A/D converter 82 through an amplifier 81. The digital signal is applied shading correction by a shading correction circuit 83 and outputted to a bus control circuit 84. The bus control circuit 84 has functions to transmit the digital signal inputted from the shading correction circuit 83 to the buffer memory 58 and the SV interface 71, and to transmit the digital signal inputted from the SV interface 71 to the buffer memory 58. The function of the bus control circuit 84 is selected by operating the control panel 73 with the system controller 80. During the signal processing from the CCD color sensor 55 to the bus control circuit 84, R,G,B signals are processed concurrently.

A masking processing circuit 85 and a half tone processing circuit 86 are provided between the bus control circuit 84 and the buffer memory 58. From the R,G,B signals of the bus control circuit 84, the masking processing circuit 85 forms a chrominance signal of either of yellow, magenta, cyan or black in synchronously with an image forming processing and outputs the chrominance signal. The half tone processing circuit 86 executes binarization of the chrominance signal outputted from the masking processing circuit 85 and forms a chrominance signal of pseudo halftone. The chrominance signal of pseudo halftone is temporarily stored on the buffer memory 58 and sequentially fed to the semiconductor laser driving circuit 61 in accordance with the instruction from the system controller 80, and drives the semiconductor laser 60.

Figure 11:
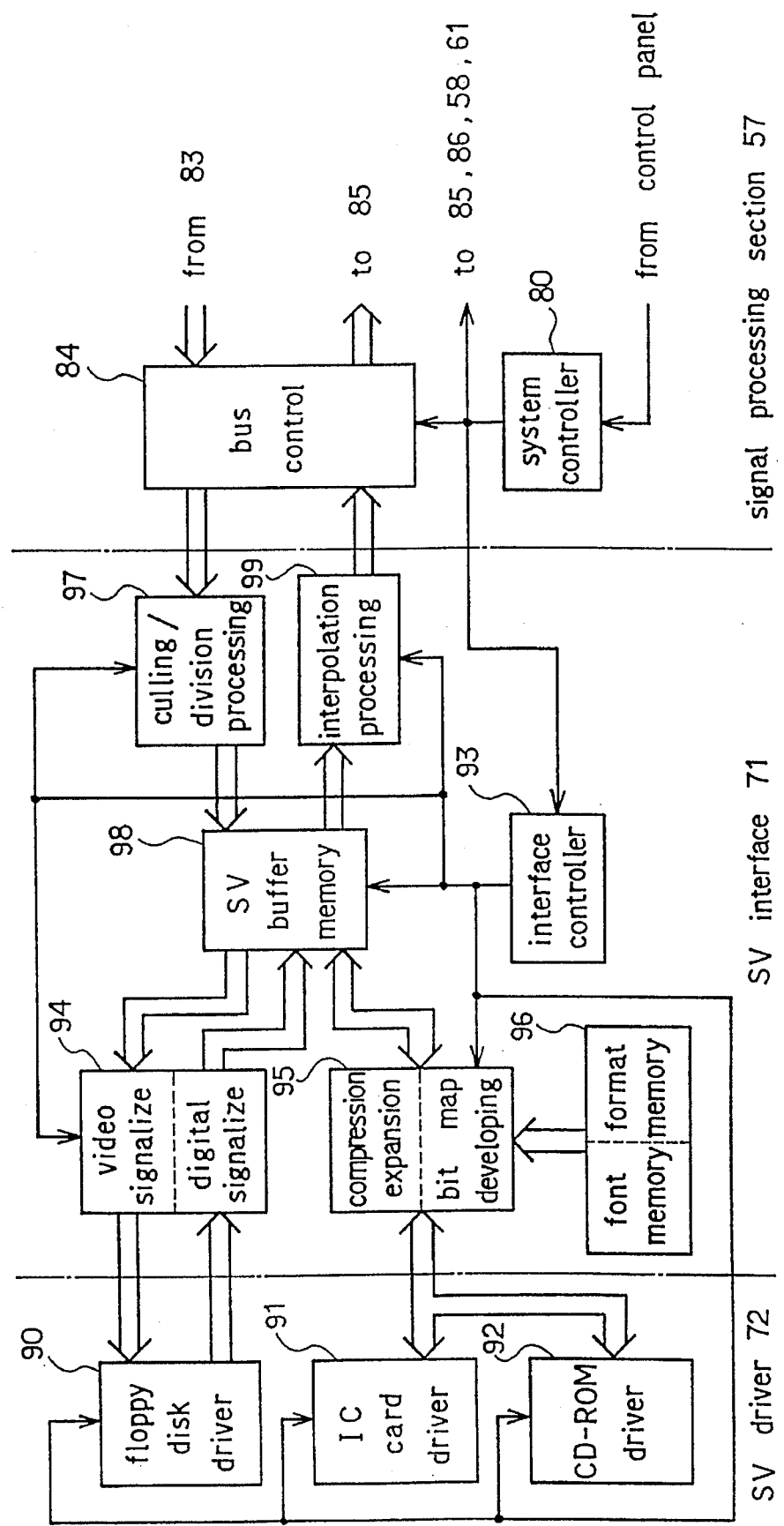
FIG. 11 is a block diagram showing a structure of an interface between a signal processing section and a still camera driver of the digital color copier.

FIG. 11 is a block diagram showing a structure between the bus control circuit 84 and the SV driver 72. The SV driver 72 includes a floppy disk driver 90, an IC card driver 91 and a CD-ROM driver 92. In the embodiment according to the present invention, three kinds of recording media, the floppy disk 2, the IC card 3 and the CD-ROM 7 can be used for a recording medium of the still video camera 1. The still video camera 1 may be so composed that other recording media can be used. Otherwise, one of three kinds of recording media may be used.

The SV interface 71 includes an I/F controller 93, a video signalize/digital signalize processing section 94, a compression or expansion/bit map developing section 95, a font memory/format memory section 96, a culling/dividing processing section 97, a SV buffer memory 98 and an interpolation processing section 99.

The image signal outputted from the signal processing section 57 is inputted to the culling/dividing processing section 97. The culling/dividing processing circuit 97 executes the signal processing in which the amount of data of the image signal outputted from the signal processing circuit 57 can be recorded on the recording medium in the still video camera 1. The image signal which is applied culling/dividing process is stored on the SV buffer memory 98. When the image signal which is applied culling/dividing process is recorded on the floppy disk 2, the image signal is converted into a video signal in the video signalize/digital signalize processing section 94 and outputted to the floppy disk driver 90. When the image signal which is applied culling/dividing process is recorded on the IC card 3 or the CD-ROM 7, the image signal is processed for compression in the compression or expansion/bit map developing section 95, and outputted to the IC card driver 91 or the CD-ROM driver 92.

The SV buffer memory 98 has functions to store temporarily the data from the culling/dividing processing section 97, the video signalize/digital signalize processing section 94 or the compression or expansion/bit map developing section 95, and output the data to the video signalize/digital signalize processing section 94, the compression or expansion/bit map developing section 95 or the interpolation processing section 99 on a predetermined time. The video signalize/digital signalize processing section 94 executes a video signalization of the image signal when the image signal is recorded on the floppy disk 2, and also executes a digital signalization of the image signal from the floppy disk 2. The compression or expansion/bit map developing section 95 executes compression of the image signal when the image signal is recorded on the IC card 3 or the CD-ROM 7, and also executes expansion of the image signal from the IC card 3 or the CD-ROM 7. At this time, based on a character code or a pattern Graphic code, the image data is called from the font memory/format memory section 98, the called image data being developed on the bit map and composed to the image. The interpolation processing section 99 has a function in which the image signal read out from the recording medium of the still video camera 1 is applied interpolation to adapt for the digital color copier 4. That is, the reverse process to the culling/dividing processing section 97 is carried out. The image signal which is outputted from the interpolation processing section 99 is inputted to the bus control section 84.

Figure 12:
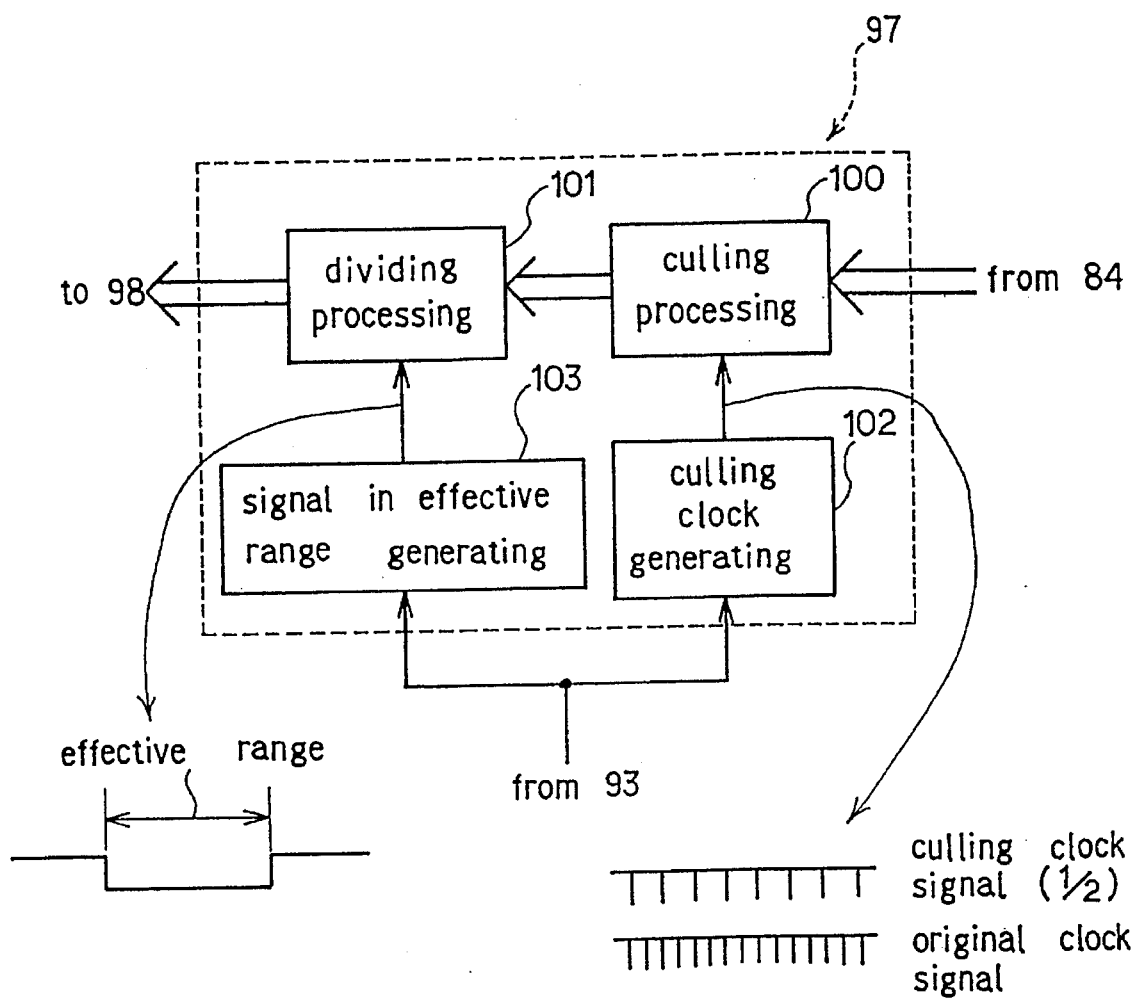
FIG. 12 is a block diagram of a culling/dividing processing section of the interface.

FIG. 12 is a block diagram showing a structure of the culling/dividing processing section 97. The culling/dividing processing section 97 comprises a culling processing section 100, a dividing processing section 101, a culling block generating section 102, and a signal in effective range generating section 103. The culling clock generating section 102 has functions to form a culling clock signal by dividing a clock signal for image transformation and to cull the image signal with each predetermined interval. The signal in effective range generating section 103 has functions to form a signal for determining the effective range of the image signal and to make the signal ineffective except for the signal in the effective area. The culling clock generating section 102 and the signal in effective range generating section 103 which are controlled by the I/F controller 93, generate desired culling clock signal or signal in effective range.

Now, the processing operation of the culling/dividing processing section 97 will be described with reference to FIG. 13. The culling/dividing processing section 97 is activated in three processing modes. The processing mode is selected on the control panel 73, and the selection is executed through the system controller 80 or the I/F controller 93.

In a first processing mode, the image signal outputted from the signal processing section 57 is culled with each predetermined interval, and the image is reduced. For example, in case of resolution for reading out the image is 16 dot/mm, the number of the picture element in longitudinal direction is 4738× 3360 when an image in an original document of A4 size (296 mm× 210 mm) is read out. In contrast, when the number of the picture element of the still video camera 1 is 786×483, the image may be reduced by about one-sixth.

In a second processing mode, the image signal outputted from the signal processing section 57 is divided into a plurality of areas in longitudinal and lateral directions of the image. With regard to the above-mentioned example, it may be understood that the image signal is divided to 42 areas by dividing the number of picture element of 786×483 into that of 4736×3360.

In a third processing mode, the image signal outputted from the signal processing section 57 is divided plurally by layer. That is, similar to the first processing mode, the image signal is culled at each predetermined interval and composed a frame with one layer. Further, the image signal is divided plurally by rendering the portion which is lost by the culling to compose other frame.

Further, referring to the second or the third processing mode, in case of dividing the image, the image signal for one scene is stored, and plural times of processes are executed on the stored image signal, thereby each divided image signal is outputted. In the third processing mode, the image is divided into plural layers by shifting the period of the culling clock signal by one picture element at each dividing process. The reduction factor of the image in the first processing mode and the number of divided scene in the second or the third processing mode can be set corresponding to the size of the original document which is detected by the image signal. Though the case of processing color image is described above, it is applicable to the monochrome image.

Figure 14:
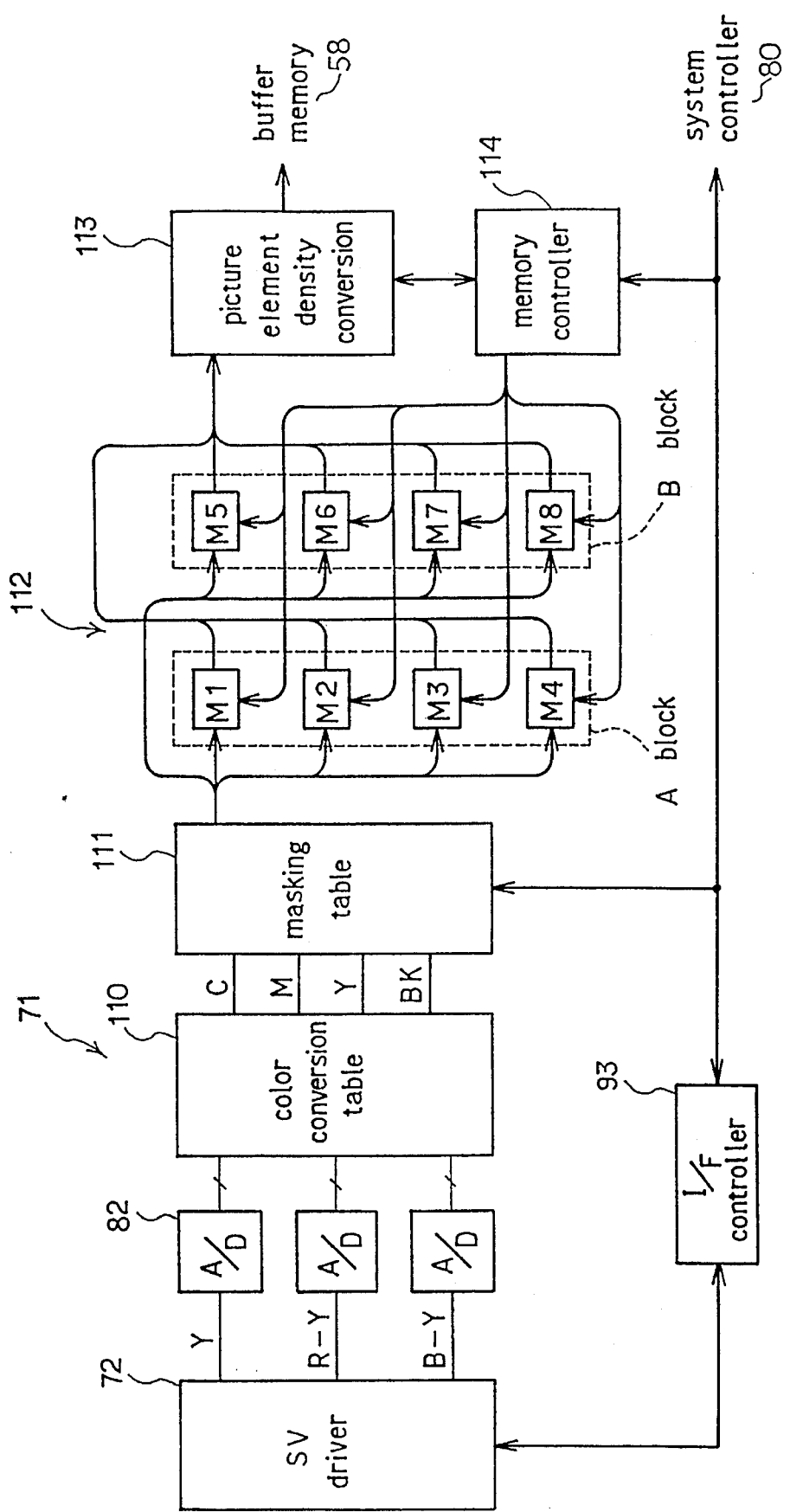
FIG. 14 is a block diagram of a SV driver 72 and a SV interface 71.

FIG. 14 is a block diagram of the SV driver 72, the SV interface 71 and the I/F controller 93 as judging means. In this embodiment, the SV driver 72 is designed to correspond to the floppy disk 2, and read out the image from the floppy disk 2. As for the recording medium of the still video camera 1, in addition to the floppy disk 2, other recording media such as the IC card 3 and the CD-ROM can be used. Referring to FIG. 14, the SV driver 72 has functions to read out the image from the recording medium such as the floppy disk or the like based on an instruction from the I/F controller 93 for controlling the SV interface 71 and to output to the SV interface 71, and further, to output the signal to the I/F controller 93 as an ID code which indicates whether the image is recorded by field recording or frame recording. When the image is recorded by the field recording, the image in one scene is recorded in one track of the floppy disk 2. Otherwise, when the image is recorded by the frame recording, the image for one scene is divided into two layers and the divided images are recorded on adjacent two tracks of the floppy disk 2 respectively.

The SV interface 71 comprises the A/D converter 82, a color conversion table 110, a masking table 111, a memory block 112 as storing medium, a picture element density conversion circuit 113 and a memory controller 114.

The luminance (Y) signal and the color difference (R-Y, B-Y) signal are inputted to the A/D converter 82 and converted into digital signals. The output from the A/D converter 82 is inputted to the color conversion table 110 and converted into a signal of cyan (C), magenta (M), yellow (Y), or a black (BK). Each signal of cyan, magenta, yellow or black is outputted to the masking table 111. According to the recording characteristic of the digital color copier 4 as a multiple-color image forming means, the color is corrected and the under color is removed (UVR) therein. The condition for color correction and remove of under color is designated by the I/F controller 93. The signal outputted from the masking table 111 is transmitted to the memory block 112 in the next process.

Figure 15:
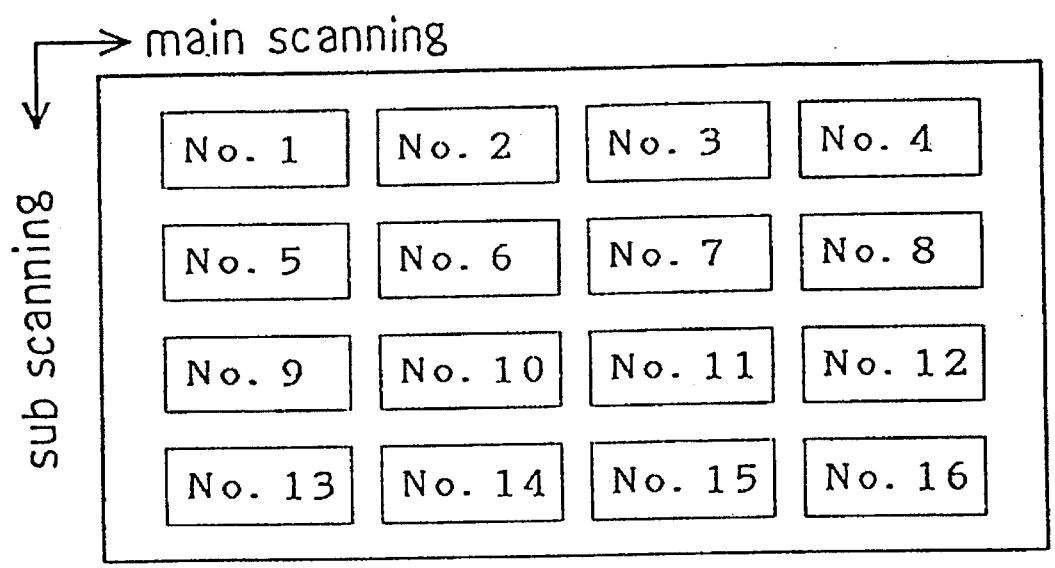
FIG. 15 illustrates an arrangement of plurality of images reproduced on a paper of A4 size.

As shown in FIG. 15, the memory block 112 is designed to be reproduced the plurality of images read out from the floppy disk 2 on the paper of A4 size in 16 scene (4×4) which are described as No.1 to No.16. The memory block 112, corresponding to four images formed in main scanning direction which corresponds to the direction of which the laser beam scans a photosensitive material for forming one line, includes A block which comprises four field memories of M1 to M4 and B block which comprises four field memories of M5 to M8. Each memory M1 to M8 can record the image signal for one field (one track of the floppy disk 2). The memory block 112 may be designed to correspond to the other format.

When the sixteen images of No.1 to No.16 are reproduced, the I/F controller 93 controls the SV driver 72 to output the signal of the image in No.1. At this time, when the image is recorded by the field recording, the image signal is read out from the one recording area in which the image is recorded. When the image is recorded by the frame recording, only the image signal in one field is read out. As mentioned above, the outputted image signal is inputted to the masking table 111 through the A/D converter 82 and the color conversion table 110. The I/F controller 93 controls the masking table 111 to output a C signal and to be stored the signal on a field memory M1. Similarly, the I/F controller 93 controls each C signal of the images in No.2 to No.4 to be stored on field memories M2 to M4 respectively.

Similarly, the I/F controller 93 controls the C signal of the images in No.5 to No.8 to be stored on field memories of M5 to M8 respectively. Simultaneously with this process, the I/F controller 93 controls the C signals which are previously stored on the memories M1 to M4 to output to the bus control circuit 84 through the picture element density conversion circuit 113. Further, the I/F controller 93 controls the C signals of the images in No.9 to No.12 to be stored on the field memories of M1 to M4. Simultaneously with this process, the I/F controller 93 controls the C signals which are previously stored on the memories M5 to M8 to output to the bus control circuit 84 through the picture element density conversion circuit 113. After repeating these processes, and when the C signals of the images in No.1 to No.16 are outputted, the same process is executed concerning to each M, Y, and BK signal. In this manner, the image signals for one page of the original document are transmitted.

The memory controller 114 controls the field memories M1 to M8 and the picture element density conversion circuit 113 in accordance with a command from the I/F controller 93. The picture element density conversion circuit 113 expands the image signal at predetermined magnification. As shown in FIG. 15, when the image is reproduced on the paper of A4 size with the resolution of 16 dot/mm, the number of the picture element which is to be recorded by the laser beam becomes 4752×3360. Accordingly, for recording sixteen images, when the number of the picture element in one field of the recording medium of the still video camera 1 is 910×263, the image signal to the main scanning direction is unchanged, and the image signal to the sub scanning direction is unchanged or may be expanded twice.

Figure 16:
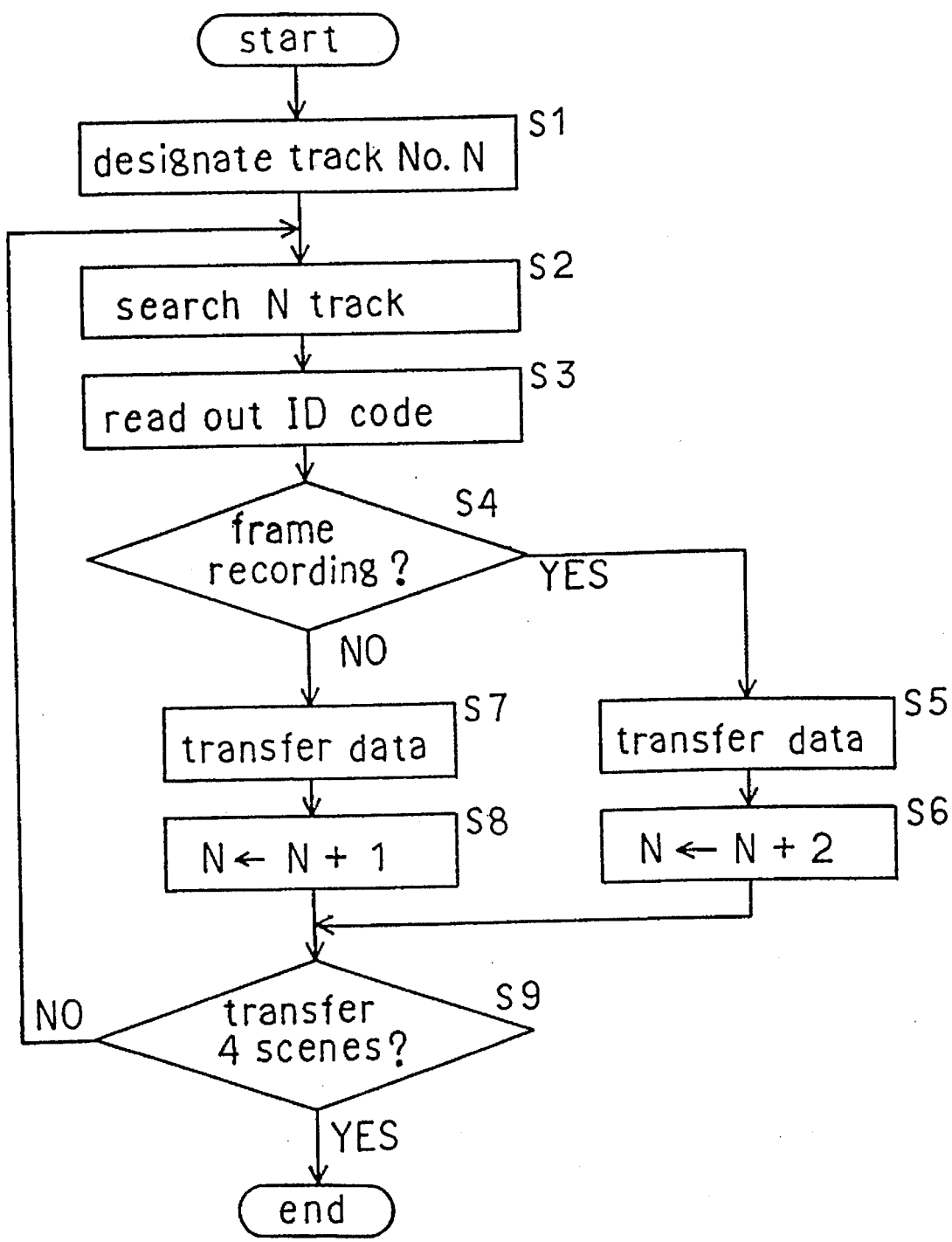
FIG. 16 is a flow chart showing a control operation executed by the I/F controller 93.

FIG. 16 is a flow chart showing a control operation executed by the I/F controller 93 in which each chrominance signal of four images is stored on four field memories respectively.

First, based on a command from the system controller 80 as controlling means, I/F controller 93 instructs the track number N to be detected to the SV driver 72 (step #1). Next, the I/F controller 93 controls the SV driver 72 to detect the track of the track number N and output the image signal (step #2). Further, the I/F controller 93 reads out an ID code from the SV driver 72 (step #3), and judges whether the image is recorded by the frame recording or the field recording (step #4).

When the image is recorded by the frame recording, the image signals in one field are transmitted from the masking table 111 to the memory block 112 (step #5), and 2 is added to the track number N. Continuously to the detection of the track of the track number N, the track of the track number N+2 is detected, and the track of the track number N+1 which corresponds to the second image recorded by the frame recording are skipped over.

When the image is recorded by the field recording, the image signal is transmitted from the masking table 111 to the memory block 112 (step #7) and 1 is added to the track number N (step #8). It is judged whether images for four scene are transmitted or not (step #9). When it is judged that the transmission is not finished, the program returns to step #2, and the same process is repeated to transmit the image signals for the four scene.

What is claimed is:

1. An image data processing system including a still video camera which carries out a photographing operation and stores photographed data in a first data form, and a digital image forming apparatus which is distinct from said still video camera, said digital image forming apparatus comprising:

an image reader which reads an image of an original document and generates image data which have a second data form different from said first data form;

a processor which receives the image data generated by the image reader and which transforms the image data generated by the image reader from said second data form to said first data form so as to be in a form usable by said still video camera;

a storing circuit which stores the image data transformed by said processor to be in said first data form on a storing medium of the still video camera for use by said still video camera; and an image forming device which forms an image on a paper based on the image data of the image reader.

2. An image data processing system as claimed in claim 1, wherein the processor reduces the image by culling the image data of the image reader.

3. An image data processing system as claimed in claim 1, wherein the processor divides the image data of the image reader into a plurality of units.

4. An image data processing system as claimed in claim 3, wherein the image data is divided into a plurality of units in correspondence with a plurality of areas located in different positions on the original document, respectively.

5. An image data processing system as claimed in claim 3, wherein the image data is divided into a plurality of units by layer division.

6. A digital image forming apparatus which is usable with a still video camera that is distinct from said image forming apparatus, said still video camera carrying out a photographing operation and storing photographed data in a first data form into a storing medium of said still video camera, said digital image forming apparatus comprising:

an image reader which reads an image of an original document and generates image data which have a second data form different from said first data form;

a holder which detachably holds the storing medium of said still video camera;

a processor which receives the image data generated by the image reader and which transforms the image data generated by said image reader from said second data form to said first data form so as to be in a form usable by said still video camera;

a storing circuit which stores the image data transformed by the processor to be in said first data form on the storing medium held by the holder; and an image forming device which forms an image on a paper based on the image data of the image reader.

7. A digital image forming apparatus as claimed in claim 6, wherein the storing medium has a plurality of storing areas for storing a predetermined amount of image data.

8. A digital image forming apparatus as claimed in claim 6, wherein the processor reduces the image by culling the image data of the image reader to be stored on each storing area.

9. A digital image forming apparatus as claimed in claim 7, wherein the processor divides the image data of the image reader into a plurality of units in which the image data is to be stored, respectively.

10. A digital image forming apparatus as claimed in claim 9, wherein the image data is divided into a plurality of units in correspondence with a plurality of areas located in different positions on the original document, respectively.

11. A digital image forming apparatus as claimed in claim 9, wherein the image data is divided into a plurality of units by layer division.

12. A digital image forming apparatus which is usable with another apparatus that is distinct from said image forming apparatus, said another apparatus storing image data in a first data form into a storing medium of said another apparatus having a plurality of storing areas for storing a predetermined amount of image data, said digital image forming apparatus comprising:

an original document setting board for setting an original document;

an image reader which reads an image of the original document set on the original document setting board and generates image data which have a second data form different from said first data form;

a holder which detachably holds the storing medium of said another apparatus;

a processor which receives the image data generated by the image reader and which transforms the image data generated by said image reader from said second data form to said first data form so as to be in a form usable by said another apparatus;

a storing circuit which stores the image data of the image reader which has been transformed by said processor to be in said first data form on the storing medium held by the holder; and an image forming device which forms an image on a paper based on the image data of the image reader.

13. A digital image forming apparatus as claimed in claim 12, wherein the processor reduces the image by culling the image data of the image reader to be stored on each storing area.

14. A digital image forming apparatus as claimed in claim 12, wherein the processor divides the image data of the image reader into a plurality of units in which the image data is to be stored, respectively.

15. A digital image forming apparatus as claimed in claim 14, wherein the image data is divided into a plurality of units in correspondence with a plurality of areas located in different positions on the original document, respectively.

16. A digital image forming apparatus as claimed in claim 14, wherein the image data is divided into a plurality of units by layer division.

17. An image data processing system comprising:

a still video camera including:

a photographing device which photographs an image;

a first holder which detachably holds a storing medium having a plurality of storing areas;

a storing circuit which stores a photographed image stored on the storing medium held by the first holder, and having a first operating mode for dividing a single image plurally and storing on a plurality of storing areas, and a second operating mode for storing a single image on a single storing area; and a digital image forming apparatus which is distinct from said still video camera and including;

a second holder which detachably holds the storing medium of the still video camera;

a judging circuit which judges whether each image stored on the storing medium held by the second holder is stored in the first operating mode or the second operating mode;

a read out device which is responsive to the judging circuit and reads out the image from one of the storing areas in which the image is stored when each image stored on the storing medium is stored in the first operating mode, and reads out the image from the single storing area in which the image is stored when the image is stored in the second operating mode; and an image forming device which forms a plurality of images read out by the read out device on a same sheet of paper.

18. An image data processing system as claimed in claim 17, wherein the image forming device has a memory to store a plurality of images to be formed.

19. An image data processing system as claimed in claim 17, wherein the still video camera includes a storing medium which stores identification data to identify whether each image is stored in the first operating mode or the second operating mode, and the judging circuit judges based on the identification data stored on the storing medium.

20. A digital image forming apparatus comprising:

a holder which detachably holds a storing medium having a plurality of storing areas on which a plurality of images are stored by operating in either a first operating mode for dividing a single image plurally and storing on a plurality of storing areas, or a second operating mode for storing a single image on a single storing area;

a judging circuit which judges whether each image stored on the storing medium held by the holder is stored in the first operating mode or the second operating mode;

a read out device which is responsive to the judging circuit and reads out the image from one of the storing areas in which the image is stored when each image stored on the storing medium is stored in the first operating mode, add reads out the image from the single storing area in which the image is stored when the image is stored in the second operating mode; and an image forming device which forms a plurality of the images read out by the read out device on a same sheet of paper.

21. A digital image forming apparatus as claimed in claim 20, wherein the image forming device has a memory to store a plurality of images to be formed.

22. A digital image forming apparatus as claimed in claim 20, wherein the storing medium stores identification data to identify whether each image is stored in the first operating mode or the second operating mode, and the judging circuit judges based on the identification data stored on the storing medium.

23. An image data processing system as claimed in claim 1, wherein said image forming device forms the image on a paper based on the image data of the image reader without the aid of the storing medium.

24. A digital image forming apparatus as claimed in claim 6, wherein said image forming device forms the image on a paper based on the image data of the image reader without the aid of the storing medium.

25. A digital image forming apparatus as claimed in claim 12, wherein said image forming device forms the image on a paper based on the image data of the image reader without the aid of the storing medium.

* * * * *

UNITED STATES PATENT AND TRADEMARK OFFICE
CERTIFICATE OF CORRECTION

PATENT NO. : 5,499,113
DATED : March 12, 1996
INVENTOR(S) : Toshio Tsuboi, et al.

It is certified that error appears in the above-indentified patent and that said Letters Patent is hereby corrected as shown below:

On the Cover Page, left column, under the heading "Foreign Application Priority Data" change the filing date of the third-listed Japanese application from "Jun. 19, 1991" to --Mar. 19, 1991--.

In col. 3, line 10, change "i" to --1--.

In col. 13, line 18 (Claim 20, line 15), change "add" to --and--.

Signed and Sealed this

Second Day of July, 1996

Attest:

BRUCE LEHMAN

*Attesting Officer*       Commissioner of Patents and Trademarks